(12) United States Patent
Bajaj et al.

(10) Patent No.: US 11,456,954 B1
(45) Date of Patent: Sep. 27, 2022

(54) DATA PACKET FRAGMENTATION FOR REPLICATED PACKET TRAFFIC THROUGH A SOFTWARE-DEFINED WIDE AREA NETWORK

(71) Applicant: Versa Networks, Inc., San Jose, CA (US)

(72) Inventors: Kapil Bajaj, Fremont, CA (US); Chetan Bali, Milpitas, CA (US); Apurva Mehta, Cupertino, CA (US)

(73) Assignee: Versa Networks, Inc., San Jose, CA (US)

( * ) Notice: Subject to any disclaimer, the term of this patent is extended or adjusted under 35 U.S.C. 154(b) by 0 days.

(21) Appl. No.: 17/556,850

(22) Filed: Dec. 20, 2021

(51) Int. Cl.
*G06F 15/173* (2006.01)
*H04L 45/00* (2022.01)
*H04L 12/46* (2006.01)
*H04L 45/42* (2022.01)
*H04L 45/745* (2022.01)

(52) U.S. Cl.
CPC ........ *H04L 45/566* (2013.01); *H04L 12/4633* (2013.01); *H04L 45/42* (2013.01); *H04L 45/745* (2013.01)

(58) Field of Classification Search
None
See application file for complete search history.

(56) References Cited

U.S. PATENT DOCUMENTS

| | | | | |
|---|---|---|---|---|
| 7,359,983 B1 * | 4/2008 | Maufer | ............... | H04L 69/16 726/13 |
| 7,724,776 B2 * | 5/2010 | Julien | ............... | H04L 69/161 370/476 |
| 8,532,107 B1 * | 9/2013 | Ghosh | ............... | H04L 12/4633 700/227 |
| 8,644,339 B1 * | 2/2014 | Krishna | ............... | H04W 28/065 370/474 |
| 2012/0155460 A1 * | 6/2012 | Gu | ............... | H04L 45/74 370/389 |
| 2013/0250956 A1 * | 9/2013 | Sun | ............... | H04L 12/4633 370/392 |
| 2014/0016545 A1 * | 1/2014 | Jaiswal | ............... | H04W 80/02 370/328 |
| 2015/0281089 A1 * | 10/2015 | Marchetti | ............... | H04L 47/125 370/235 |

(Continued)

FOREIGN PATENT DOCUMENTS

EP 2600569 A1 * 6/2013 ........... H04L 1/0083

*Primary Examiner* — Phyllis A Book
(74) *Attorney, Agent, or Firm* — Loza & Loza, LLP

(57) ABSTRACT

A system and a method are described for data packet fragmentation for replicated packet traffic through an SD-WAN. In an example a first packet has an internet protocol identification (IP-ID). The first packet is replicated to create a second packet. The first packet and the second packet are fragmented into fragments for transmission through a tunnel in one or more paths between the source address and the destination address. The IP-ID of the second packet is modified. The fragments of the first packet and the second packet are separately encapsulated. The first and second packet fragments are received through the tunnel at a second node. The second node reassembles the first packet using the first packet fragments and reassembles the second packet using the second packet fragments. The IP-ID of the reassembled second packet is restored to be the IP-ID of the first packet.

20 Claims, 7 Drawing Sheets

(56) References Cited

U.S. PATENT DOCUMENTS

| | | | | |
|---|---|---|---|---|
| 2016/0050140 A1* | 2/2016 | Chinni | ............... | H04L 47/34 |
| | | | | 709/242 |
| 2017/0324849 A1* | 11/2017 | Pfister | ............... | H04L 69/324 |
| 2018/0294993 A1* | 10/2018 | Poulin | ............... | H04L 69/324 |
| 2019/0312820 A1* | 10/2019 | Yu | ............... | H04L 45/74 |
| 2020/0128113 A1* | 4/2020 | Ambati | ............... | H04L 45/74 |

* cited by examiner

DATA PACKET FRAGMENTATION FOR REPLICATED PACKET TRAFFIC THROUGH A SOFTWARE-DEFINED WIDE AREA NETWORK

TECHNICAL FIELD

The embodiments herein relate to data communication through software-defined wide area networks and, more particularly, to fragmenting replicated data packets for multiple traffic paths.

BACKGROUND

Network data communications are used for communication between nearby nodes in a local area network (LAN) and also to connect different LANs in remote locations. The wide area networks (WANs) that connect LANs carry asynchronous text and file transfer traffic and also time-sensitive traffic such as streaming and interactive communications. The disparate networks used to carry data from one node to another may have different requirements and limitations for that traffic. At the same time many of the resources being used to carry the data are virtualized. A VNF (Virtual Network Function) may take the place of a hardware router. An SD-WAN (Software-Defined Wide Area Network) may take the place of dedicated physical network resources. An SD-WAN may have at least one designated hub node for each of the branch nodes. The hub nodes are able to act as a gateway to a plurality of branch nodes. The, branch nodes themselves may have direct access to the Internet through one or more WAN links as well as through the hub nodes.

Packets that are initially transmitted over a first network supporting one Maximum Transmission Unit (MTU) may be routed across a second network (such as a WAN or SD-WAN tunnel) with a smaller MTU. If the packet size exceeds the lower MTU, then the data in the packet must be fragmented to be routed through the second network. The original packet is broken into pieces or fragments that are each carried within newly formed packets that are equal to or smaller than the lower MTU of the egress interface of the second network.

SUMMARY

Embodiments herein disclose replicating fragmented packets for transmission through a Software-Defined Wide Area Network (SD-WAN). Some embodiments include receiving a first packet at a first node, the first packet having a source address, a destination address, and an internet protocol identification (IP-ID), replicating the first packet to create a second packet, fragmenting the first packet and the second packet into fragments for transmission through a tunnel in one or more paths between the source address and the destination address, modifying the IP-ID of the second packet, encapsulating the fragments of the first packet and separately encapsulating the fragments of the second packet for transmission through the tunnel, transmitting the encapsulated first packet fragments and the encapsulated second packet fragments through the tunnel, receiving the encapsulated first packet fragments through the tunnel at a second node, reassembling the first packet at the second node using the first packet fragments; receiving encapsulated second packet fragments through the tunnel at the second node; reassembling the second packet at the second node using the second packet fragments; and restoring the IP-ID of the reassembled second packet to be the IP-ID of the first packet.

In further embodiments, the node is on a first network having a first maximum transmission unit that is larger than the first packet, wherein the tunnel has a second maximum transmission unit that is smaller than the first packet, and wherein the fragments are smaller than the maximum transmission unit of the tunnel. Further embodiments, include applying an internet protocol (IP) header to each fragment, the IP headers including the source address, the destination address, and the IP-ID.

In further embodiments, modifying the IP-ID comprises adding a constant to the IP-ID of each fragment of the second packet. In further embodiments, the fragments of the second packet include an overlay header with an indication of the constant added to the IP-ID. In further embodiments, the fragments of the second packet include an overlay header with an indication of a replication ID, the replication ID being a scaling factor applied to the constant.

In further embodiments, encapsulating comprises encapsulating each fragment with an SD-WAN header. In further embodiments, encapsulating comprises applying tunnel encapsulation to the fragments. In further embodiments, each fragment is encapsulated with an IP header, the IP headers including the source address, the destination address, and the IP-ID.

Further embodiments include determining that the reassembled first packet is corrupted, discarding the reassembled first packet, and substituting the reassembled second packet for the reassembled first packet. In further embodiments, the first node is a branch of an SD-WAN. In further embodiments, the second node is a branch of the SD-WAN.

In further embodiments, the second node is on a first network having a first maximum transmission unit that is larger than the first packet, wherein the tunnel has a second maximum transmission unit that is smaller than the first packet, and wherein the fragments are smaller than the maximum transmission unit of the tunnel.

Further embodiments include selecting a first path to the destination address for the first packet, and selecting a second path to the destination address for the replicated packet. In further embodiments, restoring the IP-ID of the reassembled second packet comprises reading a constant from the encapsulation of the second packet, and subtracting the constant from the IP-ID of the second packet.

Some embodiments pertain to a non-transitory computer-readable storage medium containing program instructions, wherein execution of the program instructions by the computer causes the computer to perform operations that include receiving a first packet at a first node, the first packet having a source address, a destination address, and an internet protocol identification (IP-ID), replicating the first packet to create a second packet, fragmenting the first packet and the second packet into fragments for transmission through a tunnel in one or more paths between the source address and the destination address, modifying the IP-ID of the second packet, encapsulating the fragments of the first packet and separately encapsulating the fragments of the second packet for transmission through the tunnel, transmitting the encapsulated first packet fragments and the encapsulated second packet fragments through the tunnel, receiving the encapsulated first packet fragments through the tunnel at a second node, reassembling the first packet at the second node using the first packet fragments, receiving encapsulated second packet fragments through the tunnel at the second node, reassembling the second packet at the second node using the second packet fragments, and restoring the IP-ID of the reassembled second packet to be the IP-ID of the first packet.

In further embodiments, modifying the IP-ID comprises adding a constant to the IP-ID of each fragment of the second packet and wherein the fragments of the second packet include an overlay header with an indication of the constant added to the IP-ID. In further embodiments, the fragments of the second packet include an overlay header with an indication of a replication ID, the replication ID being a scaling factor applied to the constant Some embodiments pertain to an apparatus that includes a first node of a wide area network having a replication module of the first node to receive a first packet at the first node, the first packet having a source address, a destination address, and an internet protocol identification (IP-ID) and to replicate the first packet to create a second packet, a fragmentation module of the first node to fragment the first packet and the second packet into fragments for transmission through a tunnel in one or more paths between the source address and the destination address, and to modify the IP-ID of the of the second packet, and an egress module of the first node to encapsulate the fragments of the first packet and separately encapsulate the fragments of the second packet for transmission through the tunnel, and a second node of the wide area network having an ingress module of the second node to receive the encapsulated first packet fragments through the tunnel at the second node, and to receive the encapsulated second packet fragments through the tunnel at the second node, and a reassembly module to reassemble the first packet at the second node using the first packet fragments and to reassemble the second packet at the second node using the second packet fragments, wherein the second packet is a replication of the first packet, wherein the reassembly module is further to restore the IP-ID of the reassembled second packet to be the IP-ID of the first packet.

In further embodiments, the egress module encapsulates the fragments by encapsulating each fragment with a software-defined wide area network header including the IP-ID. In further embodiments, the software defined wide area network header of the fragments of the second packet include an indication of a constant added to the IP-ID of the second packet.

BRIEF DESCRIPTION OF THE FIGURES

The embodiments herein will be better understood from the following detailed description with reference to the drawing figures, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In cases of packet loss on a data path, packet replication and forward error correction (FEC) may be used to compensate for the packet loss. However, these techniques increase the total traffic on a link, which may cause even more packet loss. Lost packets at the receiving node may be recovered using Forward Error Correction. FEC may be used alone or together with packet replication and other techniques for sites that are experiencing a loss of clarity in VoIP calls or for any other time critical traffic which is experiencing packet loss on a path.

Packet replication may be used to minimize packet loss and reduce network latency. When there are two or more paths, packet replication may be implemented by sending copies of a packet on alternate available paths to reach the next hop, branch, or hub. The duplicate packets are used to replace packets that are lost or damaged. Any unneeded duplication is discarded at the receiving node and the original order of the packets may be preserved while forwarding packets to the end host.

When a packet is too large to be routed through a tunnel, e.g., an SD-WAN tunnel, the packet may be fragmented into SD-WAN packets that are encapsulated with identifying information to allow the large packet to be reconstructed after the tunnel. The packet fragmentation may be either post-tunneling, corresponding an outer or underlay packet, or pre-tunneling, corresponding to an inner or overlay packet.

Figure 1:
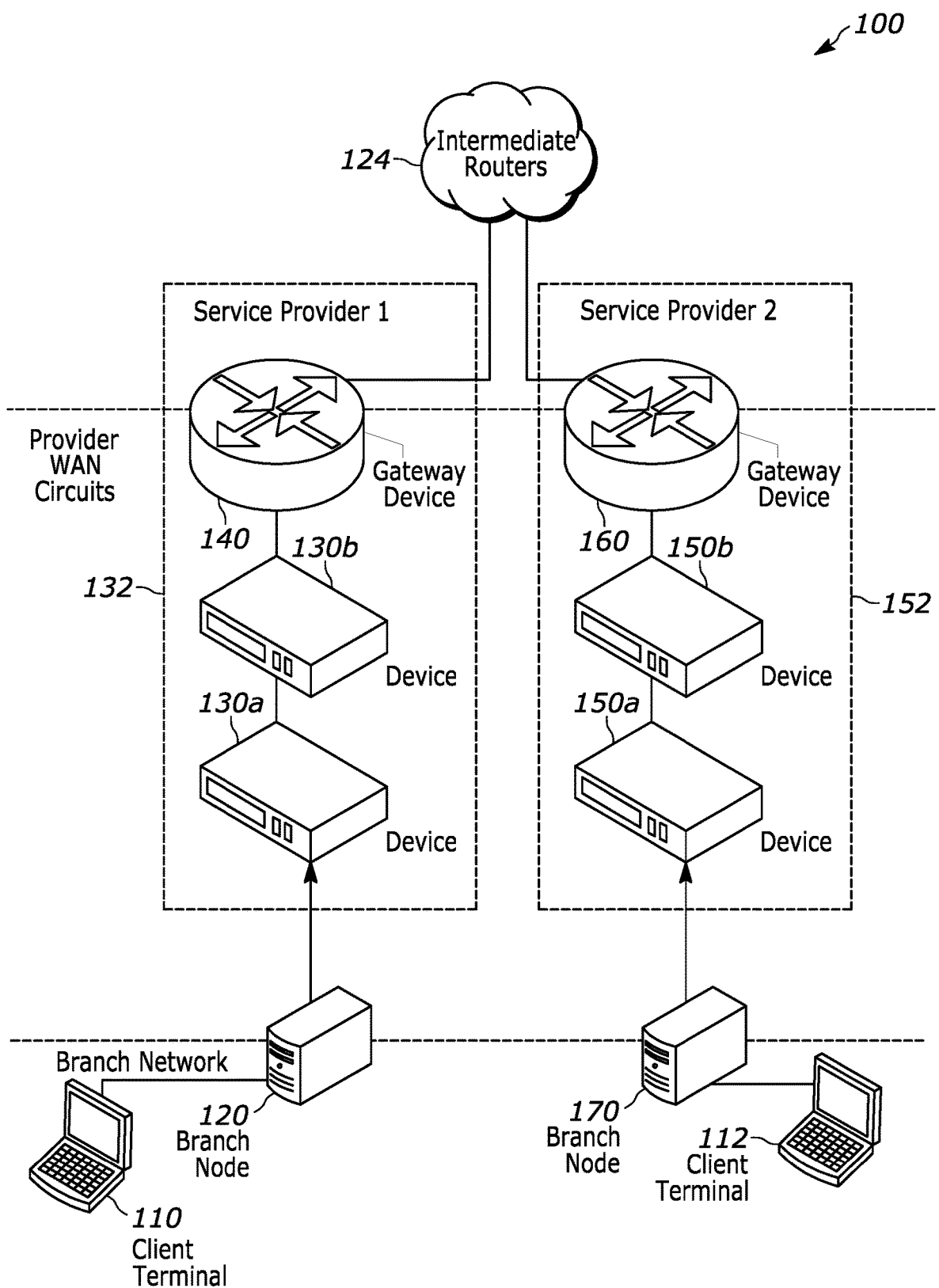
FIG. 1 is a schematic diagram illustrating an example topology used to illustrate the methods disclosed herein.

FIG. 1 is a schematic diagram illustrating an example topology used to illustrate the methods disclosed herein. The example topology shows two branch networks, each with a plurality of devices such as client terminals 110, 112 having access to each other through a respective branch node 120, 170 each using inks through different service providers (Service Provider 1 132 and Service Provider 2 152) or other routing services via their respective WAN circuits. In the example topology, the WAN circuits can be part of an overlay network that includes one or more hub nodes.

Intermediate routers 124 are coupled to each of the WAN circuits to allow the client terminals to communicate with each other and to connect to remote applications through the paths provided by Service Provider 1 132 and Service Provider 2 152. While a branch node 120 is shown as a first site and a hub node 170 is shown as a second site, other configurations may be used to connect to the client terminals 110, 112. The first and second sites may correspond to any SD-WAN or similar type of device, e.g., a branch, hub or spoke. The packet fragmentation described herein featuring modifying and restoring IP-ID field values and other techniques operates between the two SD-WAN sites or similar types of devices. Any one or more of the connections, links, or paths may be fully or partially wired or wireless.

The intermediate routers 124 and each of the WAN circuits can have a plurality of routing devices. For example, the network of Service Provider 1 has a plurality of devices 130a, 130b performing networking functions and at least one gateway routing device 140. Similarly, the network of Service Provider 2 has a plurality of devices 150a, 150b performing networking functions and at least one gateway routing device 160. The two paths or links through different service providers 132, 152 represent possible available routes, e.g., SD-WAN paths between the first and the second sites. While the two paths are labeled as Service Provider 1 and Service Provider 2, the nature of any commercial connection between the two paths is not important to the operations and structures described herein.

As illustrated in FIG. 1, branches can be configured using single or multiple broadband circuits provided by service providers 132, 152 or others and connected directly to the branch nodes 120, 170, intermediate routers 124, hub nodes, and spokes. In such scenarios, there may be various candidates for the best path to any particular application including but not limited to a direct connection from the branch, or through another node deployed as a cloud interconnection hub. Such hubs may be deployed in a variety of locations, for example, a third-party data center, an Internet interconnection, a hosting facility, or the data center of an application provider.

Figure 2:
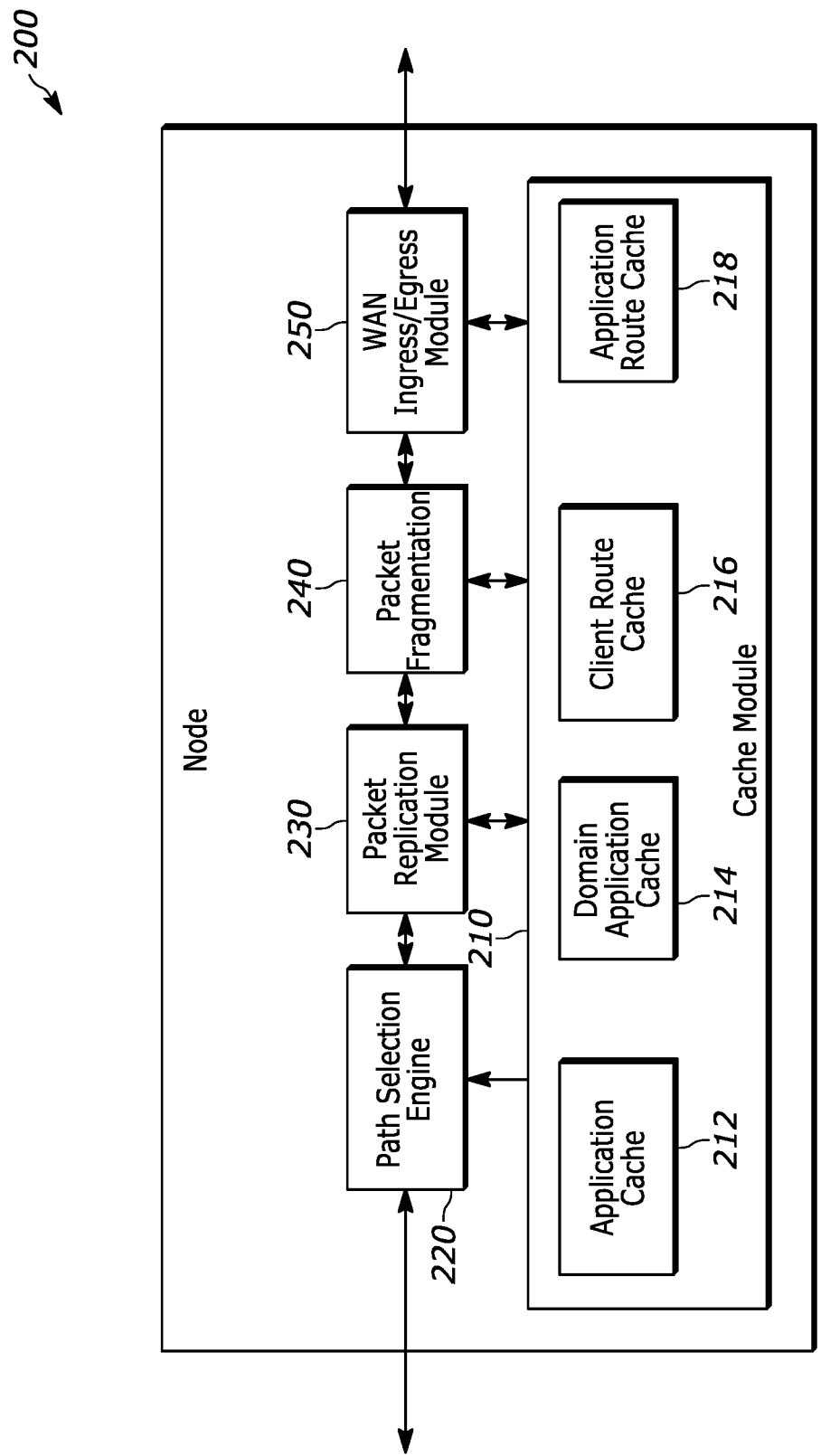
FIG. 2 is a block diagram of a branch or hub node, according to embodiments herein.

FIG. 2 is a block diagram of a node 200, which may be a branch node or a hub node, or another network node according to embodiments herein. The node 200 includes a cache module 210 with various caches (e.g., application cache (AC) 212, domain application cache (DAC) 214, client route cache (CRC) 216, and application route cache (ARC) 218) to store mapping information, a path selection engine 220 for performing path selection for Domain Name System (DNS) and data session traffic between nodes (e.g., hub-hub, hub-branch, or branch-branch nodes), a packet replication module 230 to replicate packets for transmission or select from among received replicated packets, a packet fragmentation module 240 to fragment packets or to reassemble packet fragments, and a WAN ingress/egress module 250 to encapsulate or decapsulate packet fragments for transmission through connecting WANs and SD-WANs. The WAN ingress/egress module 250 operates as an egress module for outgoing packets and as an ingress module for incoming packets. Similarly, the packet fragmentation module 240 operates as a fragmentation module for outgoing packets and a defragmentation module for incoming packets. The packet replication module 230 operates as a packet replication module for outgoing packets and as a packet selection module for incoming packets to select between received original and received replicated packets. The functionality of each of the modules will be described in the context of the methods described herein. Additionally, each of the modules may be implemented through computer-readable instructions that are executed on a physical processor of a computing system that supports the node.

In an embodiment, the ARC 218 stores a near term history of all known paths for a given application along with the associated performance metrics and a score e.g., packet loss, link utilization, delay, MOS (Mean Opinion Score), SLA (Service Level Agreement), and ALS, among others. The ARC information can be used to select the best path for an application. In an embodiment, the best path is a path that has the lowest latency, the lowest packet loss, and/or the lowest economic cost, or a combination thereof. In an embodiment, entries are added to the ARC as and when performance metrics are learned for an application session on a particular path. The server prefix for an application may be 0 or a specific prefix. The ARC can be used to maintain scores for applications or services, as well as for an application on a per-server basis (as the application may be served by many different IP addresses).

The AC 212 is a cache used to store a mapping between (routing instance, destination IP, destination port) tuple to an application or service. In an embodiment, an application cache entry is created when the application is identified for a given session. An AC entry may be associated with more than one application or service. In an embodiment, the AC is used to identify the application or service for a session on the first packet, so that application specific rules (for example, based on SD-WAN policy) can be looked up without relying on deep packet inspection (DPI)-based application identification, which happens later in the life of the session.

The DAC 214 is a cache used to store a mapping between a DNS name and an application or service. A DAC entry is created when an application is detected in a data session (for example, HyperText Transfer Protocol (HTTP) or HTTP Secure (HTTPS session). In an example session involving an HTTP session, the domain name is obtained from the HTTP host header, and for an HTTPS session, the domain name is obtained from the Server Name Indication (SNI) field in the Secure Socket Layer (SSL) client hello field.

The CRC 216 is a cache which is used to store a mapping between the (routing instance, source IP address, destination IP address) tuple and a path, (either a WAN circuit or an indirect path via a hub node). The CRC can be used to maintain path affinity for sessions initiated by a client to a specific server.

Outer packet fragmentation (not shown) may result in packet drops by intermediate routers. In addition, the post tunneling fragmentation or outer packet fragmentation requires fragmentation and reassembly at each intermediate router on the path. If there is more than one intermediate router, then the additional fragmentation and reassembly adds latency to the transmission, subsequently decreasing the performance. As a result, inner packet fragmentation as in FIG. 3 is preferred in the embodiments described herein to avoid any need for fragmentation handling by intermediate routers 306 in the intermediate WAN.

Figure 3:
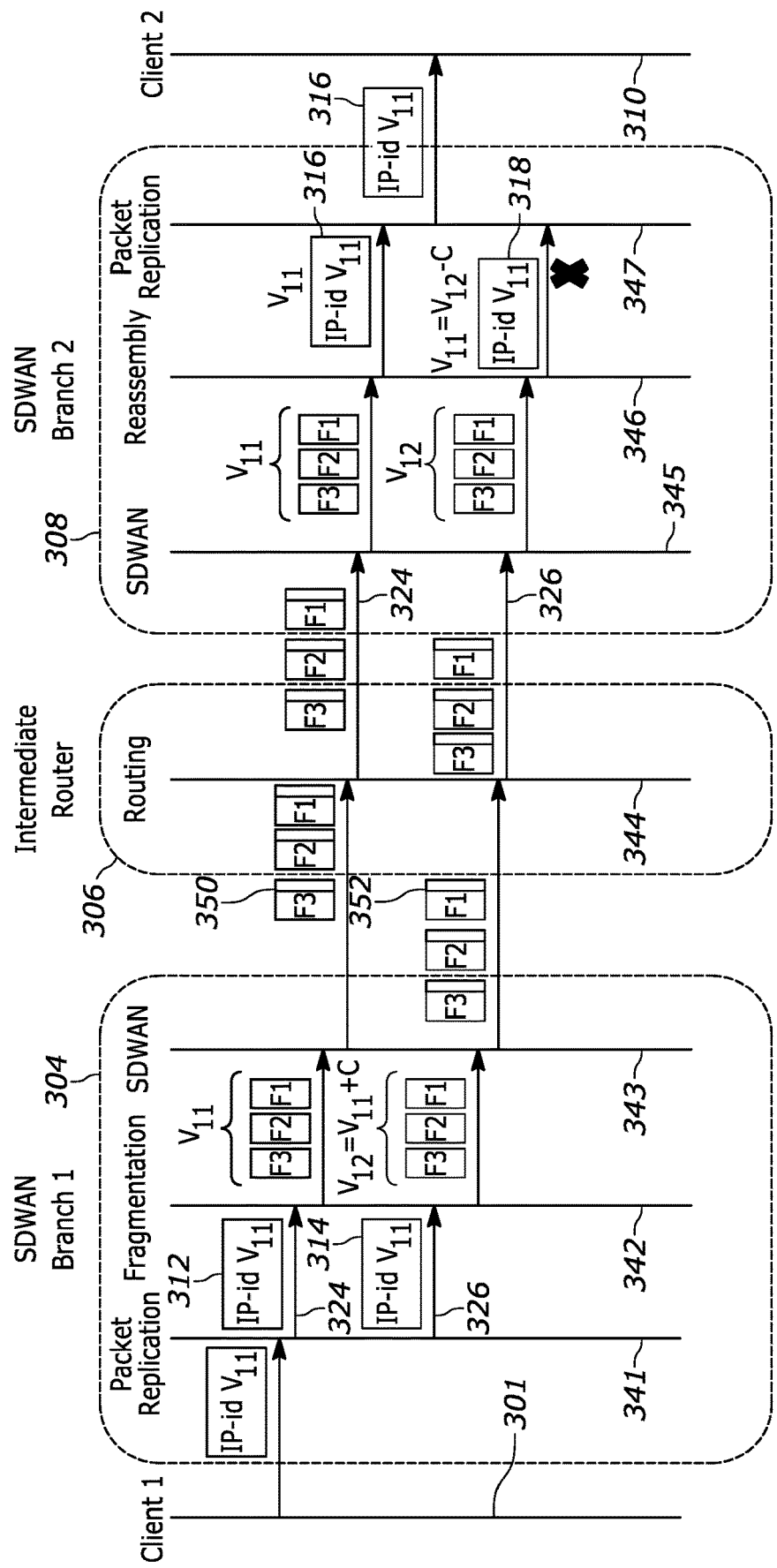
FIG. 3 is a packet transmission diagram in which a first packet and a second replica packet are sent with inner packet fragmentation through an intermediate router, according to embodiments herein.

FIG. 3 is a packet transmission diagram in which a first packet and a second replica packet are sent with inner packet fragmentation through an intermediate router. The first packet 312 and the replica second packet 314 are fragmented to be transmitted through an intermediate router with a smaller MTU. The first packet 312 originates at a first client 302 and is encapsulated with SD-WAN headers in a first branch 304 to traverse a path through intermediate routers 306 and a second branch 308 to a second client 310. The second client 310 is coupled to the second branch 308. The first branch 304 and the second branch 308 are connected through intermediate routers 306 with a smaller MTU than the first branch 304 and the second branch 308. The first branch 304 and the second branch 306 may represent a local WAN or SD-WAN and the intermediate router 306 may represent a tunneling path through the Internet or another WAN or SD-WAN. However, the fragmentation described herein may be applied to many different scenarios. In addition, packets may be fragmented for other reasons and not only to meet MTU limitations.

Two paths are shown. The upper path 324 and the lower path 326 show how inner packet fragmentation (inner/overlay) may be performed for pre-tunnelling fragmentation as compared to how outer packet fragmentation (outer/underlay) may be performed for post-tunneling fragmentation as discussed above. The paths are upper and lower only in the context of the drawing figures and not in any sense of routing or handling by the clients or branches. The first packet 312 has an internet protocol (IP) ID V11. The value V11 of the IP-ID field is included inside the IP header of the first packet 312 and the value is indicated in the FIG. as V11. V11 is used to designate a variable for a first packet and does not indicate a value of eleven or any other particular numerical value.

The first packet 312 is replicated by packet replication 341 within the first branch 304 to generate a second packet 314 that is sent along the lower path 326. In both paths, the first packet 312 and the second packet 314 are fragmented at packet fragmentation 342 of the first branch 304. Each fragment is then encapsulated with SD-WAN headers at SD-WAN encapsulation 343 at the first branch 304 and before being passed to routing 344 through the intermediate router 306. The intermediate router 306 may represent multiple paths through a WAN and routing 344 may represent multiple routers. The first packet 312 and the second packet 314 may travel on the same or different paths through the intermediate router 306. While only one packet 312 is shown on the upper path, the one packet may be one in a sequence of packets sent to the second client 310. There may be other sequences of packets addressed to other nodes through the second branch 308 or through other branches.

In the upper path 324, the first packet 312 is fragmented into three fragments, F1, F2, F3. The fragments are each identified with the IP-ID V11 in their respective IP headers. Each fragment also has a respective encapsulation header for use in traversing the routing 344. The encapsulation header may include a 5-tuple for a path from the first branch 304 to the second branch 308 or for another suitable path. As shown, each of the three fragments F1, F2, F3 have an encapsulation header because each fragment is sent through the tunnel independent of each other fragment. At the SD-WAN ingress point 345 at the second branch 308, the fragments F1, F2, F3 decapsulated so that the encapsulation header is parsed and removed. At packet reassembly 346 the fragments are reassembled into a single packet 316 with IP-ID V11. At packet replication 347 of the second branch, the packet is inspected and if the fragments have arrived and are correctly assembled, then the first packet 316 is passed to the second client 310.

The IDs shown and described are used as examples to show when a same or different ID is applied for a packet as compared to a replication packet. As an example, after replication, the first packet 312 and the new second packet 314 have the same IP-ID, shown here as V11.

Similarly, in the lower path 326, the second packet 314, is generated as a replication of the first packet. Packet replication 341 of the first branch 304 receives the first packet 312 and generates the replica. The second packet is fragmented at packet fragmentation 342 at the first branch 304 into three fragments F1, F2, F3, and then each fragment is encapsulated with SD-WAN headers 352 at SD-WAN encapsulation 343 before each fragment is sent on underlay links through the intermediate router 306. The second packet fragments are received at the second branch 308 from the intermediate router 306, just as the first packet fragments were received at the second branch 308.

At the SD-WAN ingress point 345 of the second branch 308, the fragments are de-encapsulated leaving the three fragments F1, F2, F3 of the second packet 314 with an IP header containing IP-ID V12. At reassembly 346 of the second branch 308, the fragments are combined to form a single packet 318 which is not forwarded to the second client 310. The second branch 308 includes packet replication 347 at which the packets are tested for missing fragments or other errors. If a packet is received in error, then it is dropped and the other packet is forwarded to the second client 310. In this example, if both packets are received and reassembled successfully, then the second packet 318 is dropped. The second packet 318 may be second in arrival time, as shown, or second in priority, or second in some other respect. In the illustrated example, the second client receives the first packet 316 after the first packet has been restored but the client does not receive the replication of the first packet, which is the second packet 318, after it has been restored.

The process of fragmentation at packet fragmentation 342 in the egress branch and subsequent reassembly at packet reassembly 346 at the ingress branch involves setting several IP header fields for the fragments. The IP identification field in the IP header, along with the IP protocol, and source/destination IP addresses play a key role in uniquely identifying the tuple for a fragmented packet. The tuple may be represented by the IP-ID. The tuple may also include source address, destination address and other information. This allows the destination to distinguish between the fragments of different packets, including different fragments from the same source. As an example, if a first packet and a second later packet are transmitted from the first branch 304 to the second branch 308, then each packet is split into fragments. Assume that there are four fragments. Each of the four fragments of the first packet share the same IP-ID field value and each of the four fragments of the second packet share the same IP-ID field value. If the IP-ID field value of the first packet is different from the IP-ID field value of the second packet, then the IP-ID field values of the first packet fragments will be different from the IP-ID field values of the second packet fragments.

As shown in FIG. 3, the SD-WAN network can replicate packets over multiple available paths. This may help to minimize loss and improve the latency. When the traffic contains packets larger than the path MTU size, these packets may be fragmented to multiple smaller packet fragments. Inner packet fragmentation is used for the packet and the replica as shown. When inner or outer fragmentation is applied to replicas of the same packet, then the original and the replicas will contain the same IP-ID field value in the IP header of all the copies of the packet and correspondingly in the headers of all of the fragments.

Since the fragments of the replicated packet may be sent over different paths, fragments of different packets may arrive out of order at the receiving SD-WAN branch. Having the same IP-ID field value can cause the receiving branch to reassemble the packet from received fragments in an incorrect manner. This may result in corrupt packets.

Consider a first client sending a packet with an IP-ID V11 to Branch 1. Branch 1 replicates this packet to create a new packet with IP-ID V11. Being a copy of the original packet with IP-ID V11, it contains the same IP identification value. Both the packets are fragmented into three fragments F1, F2 and F3 before Branch 1 sends the fragments to tunnel encapsulation at the SD-WAN module.

When the fragments arrive at the SD-WAN ingress at Branch 2, the outer wrappers are stripped off as the fragments are de-encapsulated from the tunnel. If the six packet fragments were to all have the same IP-ID field values, then the packet reassembly module would not be able to determine which fragments are to be combined and in which order. The packet fragments may be traversing different routes so that they may arrive at Branch 2 in a different order or sequence than the order in which they were sent. If the fragments are not received in the original order at Branch 2 then the reassembled packet may be in error. In addition, if fragments from the original packet are mixed with fragments from the replica packet, then the reassembled packet may be corrupted.

In order to distinguish fragments of packets from fragments of replicas, including multiple different replicas, the IP-ID field value may be modified for each replica before encapsulating the fragments and sending the replicas over the tunnel paths. For the second packet 314 the fragmentation 342 also modifies the IP-ID field for each of the fragments by adding a constant, C, to the IP-ID of the first packet. This is labeled as V12 which is V11+C. In this way when the fragments on the lower path arrive at packet reassembly 346 of the second branch 308, the original packet is restored by also restoring the IP-ID field value to the original V11 by subtracting C from the IP-ID value in the IP header of each fragment. Other operations may be used instead of adding or subtracting a constant in order to modify the IP-ID field value.

Figure 4:
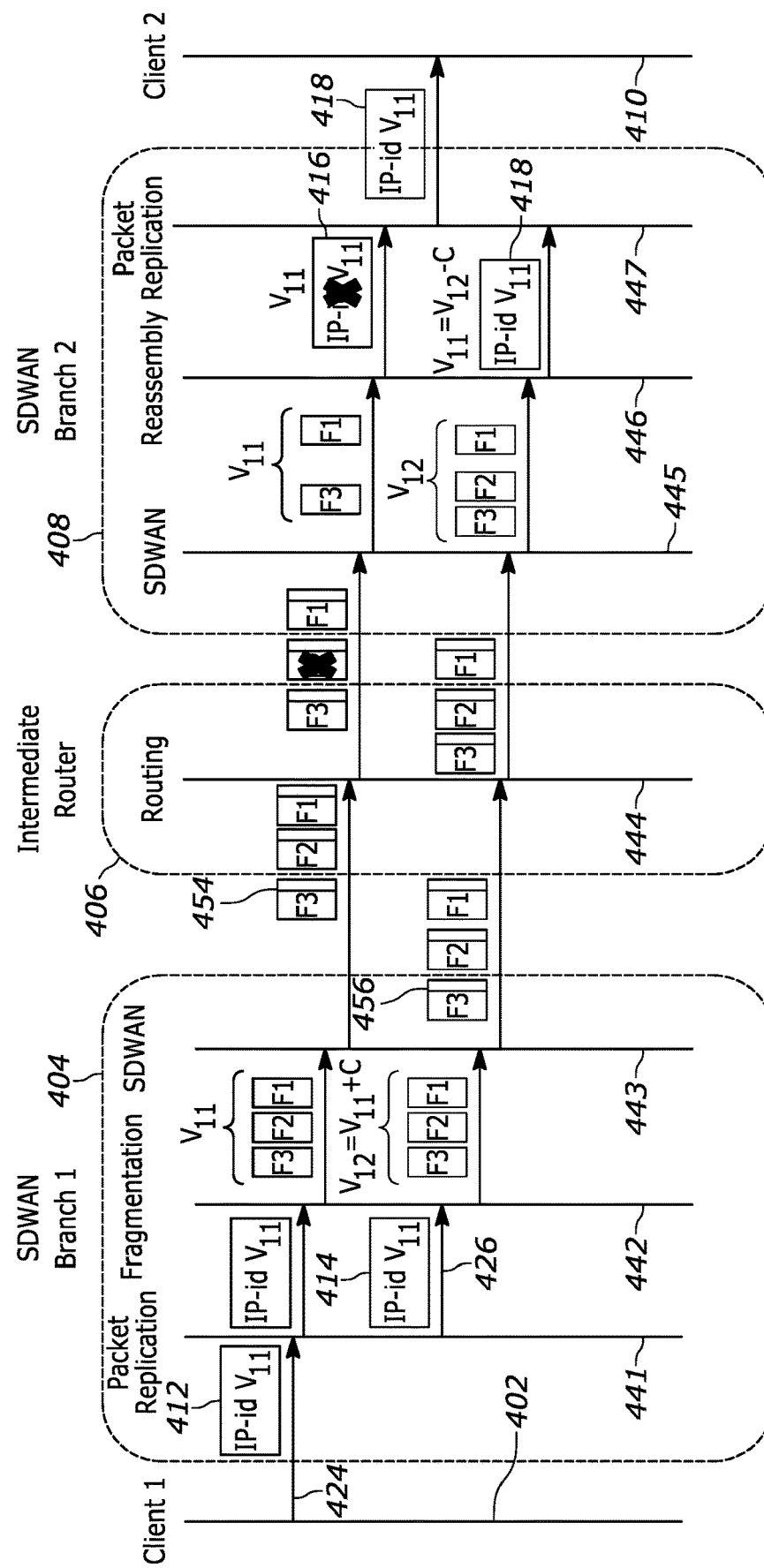
FIG. 4 is a packet transmission diagram in which a first packet and a second replica packet are sent with inner packet fragmentation in which a fragment is lost, according to embodiments herein.

FIG. 4 is a packet transmission diagram in which the IP-ID field value is also modified for the replication fragments. All of the fragments are sent with inner packet fragmentation. The first packet 412 originates at a first client 402 and is encapsulated with SD-WAN headers in a first branch 404 to traverse the first branch 404 on a path through intermediate routers 406 and a second branch 408 to a second client 410. While only one first packet 412 is shown, the one packet may be one in a sequence of packets sent to the second client 410. There may be other sequences of packets addressed to other nodes through the second branch 408 or through other branches (not shown).

The first branch 404 and the second branch 408 are connected through intermediate routers 406 with a smaller MTU than the first branch 404 and the second branch 406. Alternatively, the packets may be fragmented before tunneling for a different reason. The first branch 404 and the second branch 406 may be a local WAN or SD-WAN and the intermediate router 406 may be a tunneling path through the Internet or another WAN or SD-WAN. However, the principles and techniques described herein may be adapted to suit different implementations.

An upper path 424 shows a route for the first packet 412, the original packet, and a lower path 426 shows a route for a second packet 414 which is a replica of the first packet. In the drawing figures, the paths are upper and lower only in the context of the drawing figures and not in any sense of routing or handling by the clients or branches. The first packet 412 has an IP-ID V11. The first packet 412 is replicated by packet replication 441 within the first branch 404 to generate a second packet 414 with the same IP-ID. In both paths, the first packet 412 and the second packet 414 are fragmented at packet fragmentation 442 of the first branch 404 and then encapsulated with SD-WAN headers at SD-WAN egress 443 at the first branch 404 before being passed to routing 444 through the intermediate router 406. The intermediate router 406 may have multiple paths. Routing 444 may have multiple routers. The first packet 412 and the second packet 414 may travel on the same or different paths through the intermediate router 406.

In the upper path 424, at packet fragmentation 442, the first packet 412 is fragmented into three fragments, F1, F2, F3. Each fragment carries the IP header of the first packet 412 that includes the IP-ID of the first packet 412. The fragments are each then individually encapsulated at the SD-WAN egress 443 with an encapsulation header 454 that includes the common IP-ID V11. The encapsulated packet fragments F1, F2, F3 are tunneled through the routing 444. At the SD-WAN ingress 445 of the second branch 408, the received encapsulated first packet fragments packets are de-encapsulated and each packet is identified with its original IP-ID that remains in its respective IP header. At packet reassembly 446, at the second branch 408, the fragments are reassembled into a single packet with IP-ID V11. In this example one of the fragments, F2, is lost, corrupted, or delayed through the intermediate router 406. After the encapsulation is removed, the first packet 412 cannot be fully reassembled and so the reassembled first packet 416 is a partial packet having only two of the three fragments is discarded. The reassembled first packet 416 defective and is not passed to the second client 410.

In the lower path 426, the second packet 414, which is a replication of the first packet generated at packet replication 441 at the first branch 404, is fragmented at packet fragmentation 442 at the first branch 404 into three fragments F1, F2, F3 each carrying the IP header of the second packet 414, the replicated packet. While three fragments are used in all of the examples of FIGS. 3, 4, and 5, this is provided as an example and the techniques and structures may be applied to fragment and de-fragment packets into any other suitable number of fragments from two fragments to many more fragments.

In the lower path 426, the IP-ID field value V12 of the second packet 414 is modified to be different from the IP-ID field value of V11 of the original packet 412. The modification is made by adding a constant value, indicated as C, to the original IP-ID field value. This may be expressed as V12=V11+C. The constant C may be any of a variety of different values. In some embodiments, C is selected such that V12 does not conflict with a few packets received before and after packets with IP-ID V11. As an example, C may be 8 so that if as many as 7 packet fragments are received before the replica fragments the earlier received fragments will not be mixed with replica packet fragments. With V12 different from V11, even if packets arrive out of order, fragments from different packets will not be reassembled with each other. The modified IP-ID of V12 is used as the inner IP-ID when the fragments are encapsulated. Each fragment is independently encapsulated with an outer IP-ID for the tunnel at the SD-WAN egress 443 and the fragments are each sent through the intermediate router 406 on the same or different routes from the original packet fragments.

In both the upper path 424 and the lower path 426 each fragment has its own outer header 454, 456 because each fragment is separately encapsulated. The encapsulated second packet fragments are received at the second branch 408 from the intermediate router 406, just as the first packet fragments were received at the second branch 408. The packets are de-encapsulated at the SD-WAN ingress 445 of the second branch 408. The IP-ID of the inner IP header is V12 after removing the wrapper. The fragments of the replica packet are then reassembled at reassembly 446 of the second branch 408.

After reassembly, the IP-ID value of V12 for the replica packet is restored back to V11 by subtracting the same constant, C. The second packet 416 is reassembled using only its own fragments and the IP-ID field value is restored to the original value of V11 to form a reassembled second packet 418 with the same IP-ID as the first packet 412. In this example, the first packet 412 is not successfully routed through the tunnel. It is received with errors and is discarded. The second packet 414 is correctly received and forwarded to the second client 410 as the reassembled second packet 418. The reassembled first packet 416 is discarded before or after reassembly and the second client 410 receives only one version of the original packet 412. If the second packet 414 were to be received in error, then it would also be dropped and another replica would be forwarded to the second client 410. If no packet is successfully received, then protocols for skipping that packet or requesting retransmission may be used. In some embodiments an application at the second client 410 manages the communication, failure, and retry attempts for packets that are generated or consumed by the application.

Figure 5:
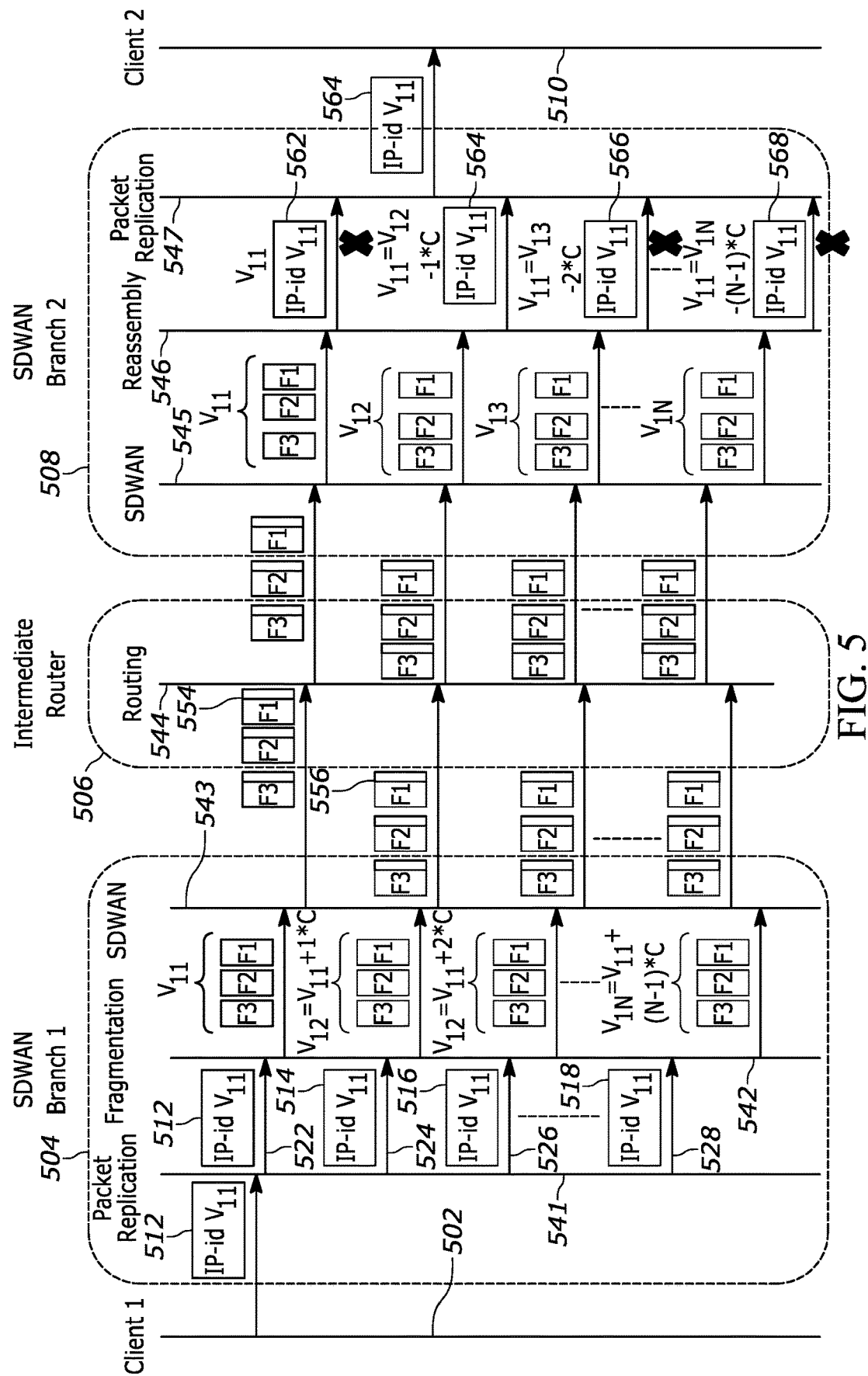
FIG. 5 is a packet transmission diagram with multiple (N) replica packets sent in which the IP-ID field value is modified differently for fragments of each replica packet, according to embodiments herein.

FIG. 5 is a packet transmission diagram with multiple (N) replica packets sent in which the IP-ID field value is modified differently for fragments of each replica packet. The first packet 512 originates at a first client 502 and is encapsulated with SD-WAN headers 554 in a first branch 504 to traverse the first branch 504 on a path through intermediate routers 506 and a second branch 508 to a second client 510. The first branch 504 and the second branch 508 are connected through intermediate routers 506 with a smaller MTU than the first branch 504 and the second branch 508.

An upper path 522 shows a route for the original packet The first packet 512 has an IP-ID V11. This is indicated as in FIGS. 3 and 4 as V11. In the upper path 522, at packet fragmentation 542, the first packet 512 is fragmented into three fragments, F1, F2, F3. The fragments are then encapsulated at the SD-WAN egress 543 and identified each in a header 554 that is part of the wrapper for tunneling through the routing 544.

At the SD-WAN ingress 545 of the second branch 508, the packets are de-encapsulated. The reassembled first packet 562 is identified with its original IP-ID V11 from the first packet 512 originally received from the first client 502. At packet reassembly 546, at the second branch 508, the fragments F1, F2, F3 are reassembled into a single packet with IP-ID V11. The reassembled first packet 562 may then be passed to the second client 510. In the example of the diagram, the first packet arrives after a first replica packet, the reassembled second packet 564, and so the reassembled first packet 562 is discarded. It may be discarded before or after reassembly.

The first packet 512 is on a first path, shown as the upper path 522, and comes to packet replication 541. The first packet is replicated so that replicas may be sent on other paths. There are N−1 replicas for a total of N identical packets. The second packet 514 is the first replica packet is sent on a second path 524. A third packet 516 is a second replica packet sent on a third path 526 and an Nth packet 518 sent on an Nth path 528. Each packet is divided into smaller packet fragments at packet fragmentation 542 of the first branch 504.

Each of the replica packets has the same IP-ID, indicated as V11. At packet fragmentation 542 or at another suitable process, the fragments are encapsulated with an inner IP-ID which differs for each replica packet. As in the example of FIG. 4, a constant, C, is added to the original packet IP-ID. To extend this technique for unique inner IP-IDs to more than one copy of the same packet, the IP-ID field may be modified so that it is different for each copy of the packet. The IP-ID field value may be a function of a replication ID which defines the number of copies of one packet sent over tunnel paths of the intermediate router 506.

Considering the first two replica packets, or two copies of the original packet, the first packet 512 from the first client 502. The IP-ID field value, V11, is carried by the first packet 512. The first replica packet, the second packet 514, will have a replication ID of 1 and the second replica packet, the third packet 516, will have a replication ID of 2. Using the constant C, the replication ID may be used as a multiplicative factor or other scaling value. In some embodiments, the IP-ID field value of the second packet 514 may be modified to V+1*C and the IP-ID field value of the third packet 516 may be modified to V+2*C to make the IP-ID field value different for all of the copies. As explained above, the modified IP-ID field values should not be same as for packets which are sent before and after the original packet with IP-ID V11, i.e. the first packet 512.

The above function of calculating IP-ID field values for the copies of the original packet can be generalized to:

$$V1N = V11 + (N-1)*C$$

where V11 is the IP-ID field value contained in the original packet where V1N is the IP-ID field value generated for the Nth copy C is the constant to generate the IP-ID value in a such a way to not conflict with the packets which are received by the first branch 504 before and after the first packet 512.

Like the first packet 512, the second packet 514, third packet 516 and each replica packet to the Nth packet 518 are encapsulated with SD-WAN headers 554, 556 at SD-WAN egress 543 at the first branch 504 after having been fragmented at packet fragmentation 542 of the first branch 504 and are then passed to routing 544 through the intermediate router 506. The intermediate router 506 may have multiple paths. Routing 544 may have multiple routers. The first packet 512 and the replica packets may travel on the same or different paths through the intermediate router 506.

At the SD-WAN ingress 545 of the second branch 508, the packets are de-encapsulated and the fragments of each packet are identified with the corresponding original IP-ID. At packet reassembly 546, at the second branch 508, the fragments F1, F2, F3 are reassembled into a single packet with IP-ID V11. After the encapsulation is removed, the first packet 512 is identified simply with IP-ID V11 in the same way that it entered the SD-WAN at the first branch. For the replica packets, the IP-IDs in the IP headers were modified before sending them to the second branch 508 through the tunnel of the intermediate routers 506. The original IP-ID is restored back to the original IP-ID which is expected by the receiving second client 510 or other end host or destination node.

At the same time at reassembly, 546, the different IP-ID values for each replica allow reassembly to avoid mixing fragments of different packets together. The integrity of each packet is maintained through fragmentation at the first branch and reassembly at the second branch. In all of the paths each fragment has its own outer header 554, 556 because each fragment is separately encapsulated. The packet fragments are de-encapsulated at the SD-WAN ingress 545 of the second branch 508. The fragments for each replica packet are then separately reassembled at reassembly 546 of the second branch 508.

All the copies of the packets are transmitted through the intermediate router with different IP-ID field values in the IP header. To restore the IP-ID field value to the original value, for example V11, of the first packet 512, the original packet, that was received by the first branch 504, each packet may contain a special information field in the SD-WAN overlay header. This information field may be used by the receiving branch, the second branch 508, to find the function to be used to restore the IP-ID field value before forwarding the packet to a next-hop or to the end host, for example the second client 510.

As an alternative, the SD-WAN Overlay header may carry a replication ID over the network. Using a known value for C, the second branch can use the replication ID as a scaling factor and the known C to restore the original IP-ID field value. The value for C may be already known to the two branches or negotiated in the beginning of a session. The overlay header may also include a value of the replication ID and for C for the respective packet.

After reassembly, the IP-ID value of each of the packets is restored back to V11 by subtracting multiples of the same constant, C. In this example, the second branch 508, as the receiving branch forwards the first correctly received packet to the second client 510 and discards all other copies of the packet. As shown, the first replica packet, which is the reassembled second packet 564 is received first. This is indicated by the position of the reassembled second packet 564 being to the right of the other packets in the drawing figure. The reassembled second packet 564 is also to the right of the reassembled third packet 566 and the reassembled Nth packet 568 which are received later and also discarded.

Figure 6:
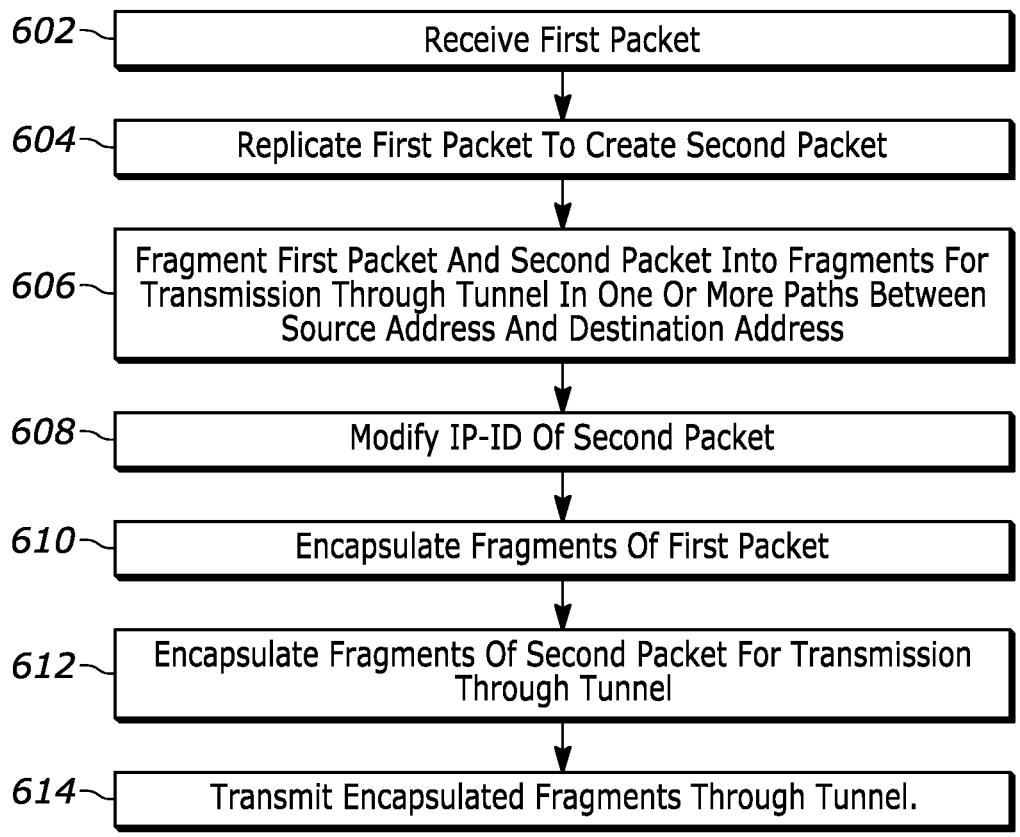
FIG. 6 is a process flow diagram to show modifying the IP-ID field value of a replicated packet for transmission through a tunnel, according to embodiments herein.

FIG. 6 is a process flow diagram to show modifying the IP-ID field value of a replicated packet for transmission through a tunnel. At 602, a first packet is received at a node. The first packet has a source address, a destination address, and an internet protocol identification (IP-ID) among other identifying features. At 604 the first packet is replicated to create a second packet.

At 606 the first packet is fragmented and the second packet is also fragmented into fragments for transmission through a tunnel in one or more paths between the source address and the destination address. In some embodiments, the packets are fragmented because the node is on a first network having a first maximum transmission unit that is larger than the first packet, where the tunnel has a second maximum transmission unit that is smaller than the first packet, and the fragments are smaller than the maximum transmission unit of the tunnel.

At 608, the IP-ID of the of the second packet, the replicated packet, is modified. In some embodiments, this is done by adding a constant to the IP-ID of the first packet. The fragments of the second packet may include an overlay header with an indication of the value of the constant that was added to the IP-ID to modify the field value. The overlay header may also include a value of the replication ID for the respective packet.

At 610 the fragments of the first packet are encapsulated for transmission through the tunnel. At 612 the fragments of the second packet are separately encapsulated for transmission through the tunnel using the modified IP-ID. In some embodiments, an IP header is applied to each fragment, the IP headers including the source address, the destination address, and the IP-ID. At 614 the encapsulated fragments are transmitted through the tunnel.

Figure 7:
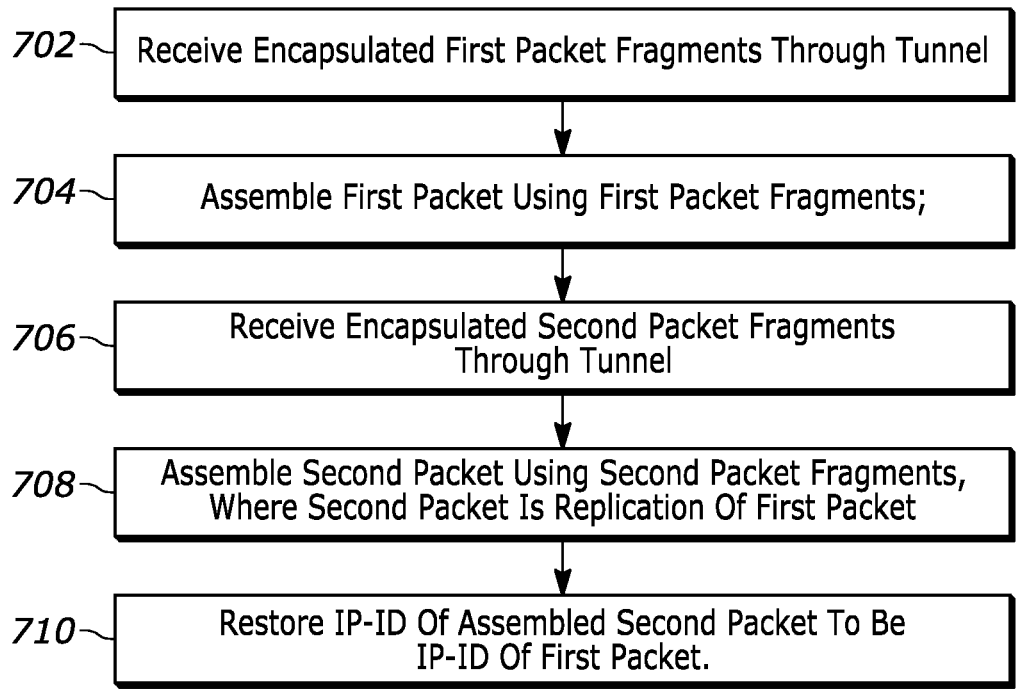
FIG. 7 is a process flow diagram to show modifying the IP-ID field value of received replicated packet fragments after transmission through a tunnel, according to embodiments herein.

FIG. 7 is a process flow diagram to show modifying the IP-ID field value of received replicated packet fragments after transmission through a tunnel. At 702 encapsulated first packet fragments are received through a tunnel at a node. The first packet fragments each have a same source address, destination address, and internet protocol identification (IP-ID). At 704 a first packet is reassembled at the second node using the first packet fragments. Each fragment may be encapsulated with an IP header that includes an IP-ID.

At 706 encapsulated second packet fragments are received through the tunnel at the second node. The second packet fragments each have a same source address and destination address as the first packet fragments, and a second internet protocol identification (IP-ID). In some embodiments, the IP-ID of the second packet fragments is the IP-ID of the first packet fragments modified by adding a constant. Each fragment may be encapsulated with an IP header that includes the modified IP-ID. The fragments of the second packet may include an overlay header with an indication of the constant added to the IP-ID. At 708 a second packet is reassembled at the second node using the second packet fragments. The second packet is a replication of the first packet. The first packet fragments and the second packet fragments are encapsulated separately for transmission through a tunnel in one or more paths between the source address and the destination address.

At 710 the IP-ID of the reassembled second packet is restored to be the IP-ID of the first packet. The first or second reassembled packet may be provided to a destination node. The receiving node may determine that the reassembled first packet or second packet is corrupted, discard the reassembled corrupted packet and substitute the other reassembled packet for the reassembled corrupted packet.

The embodiments disclosed herein can be implemented through at least one software program running on at least one hardware device and performing network management functions to control the network elements. The network elements shown in FIG. 1 and FIG. 2 include blocks which can be at least one of a hardware device, or a combination of hardware device and software module.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Figure 8:
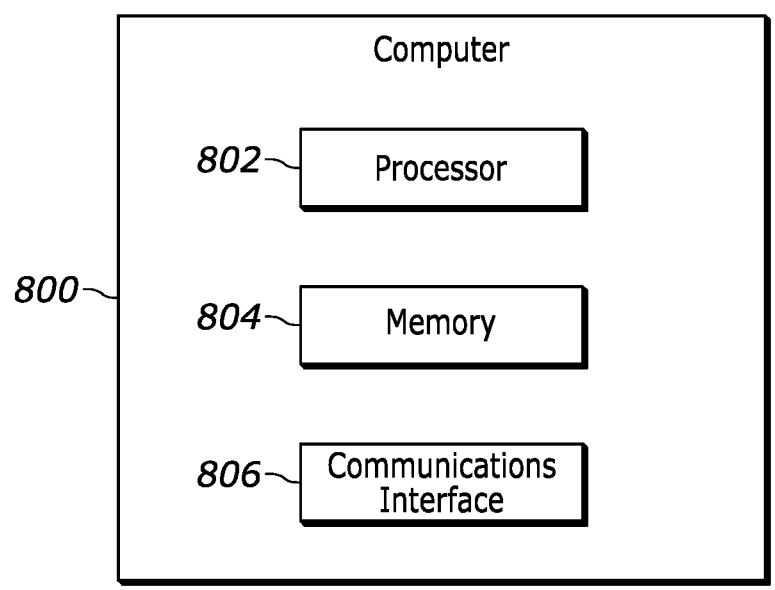
FIG. 8 depicts a computer that includes a processor, memory, and a communications interface, according to embodiments herein.

In an embodiment, the functionality described herein is performed by a computer device that executes computer readable instructions (software). FIG. 8 depicts a computer 800 that includes a processor 802, memory 804, and a communications interface 806. The processor may include a multifunction processor and/or an application-specific processor. Examples of processors include the PowerPC™ family of processors by IBM Corp. and the x86 family of processors by Intel Corp., among others. The memory within the computer may include, for example, a non-transitory storage medium such as read only memory (ROM), flash memory, random access memory (RAM), and a large capacity permanent storage device such as a hard disk drive. The communications interface enables communications with other computers via, for example, the Internet Protocol (IP).

The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method of replicating fragmented packets for transmission through a Software-Defined Wide Area Network (SD-WAN), the method comprising:
   receiving a first packet at a first node, the first packet having a source address, a destination address, and an internet protocol identification (IP-ID);
   replicating the first packet to create a second packet;
   fragmenting the first packet and the second packet into fragments for transmission through a tunnel in one or more paths between the source address and the destination address;
   modifying the IP-ID of the second packet;
   encapsulating the fragments of the first packet and separately encapsulating the fragments of the second packet for transmission through the tunnel;
   transmitting the encapsulated first packet fragments and the encapsulated second packet fragments through the tunnel;
   receiving the encapsulated first packet fragments through the tunnel at a second node;
   reassembling the first packet at the second node using the first packet fragments;
   receiving encapsulated second packet fragments through the tunnel at the second node;
   reassembling the second packet at the second node using the second packet fragments; and
   restoring the IP-ID of the reassembled second packet to be the IP-ID of the first packet.

2. The method of claim 1, wherein the node is on a first network having a first maximum transmission unit that is larger than the first packet, wherein the tunnel has a second maximum transmission unit that is smaller than the first packet, and wherein the fragments are smaller than the maximum transmission unit of the tunnel.

3. The method of claim 1, further comprising applying an internet protocol (IP) header to each fragment, the IP headers including the source address, the destination address, and the IP-ID.

4. The method of claim 1, wherein modifying the IP-ID comprises adding a constant to the IP-ID of each fragment of the second packet.

5. The method of claim 4, wherein the fragments of the second packet include an overlay header with an indication of the constant added to the IP-ID.

6. The method of claim 5, wherein the fragments of the second packet include an overlay header with an indication of a replication ID, the replication ID being a scaling factor applied to the constant.

7. The method of claim 1, wherein encapsulating comprises encapsulating the fragments with an SD-WAN header.

8. The method of claim 7, wherein encapsulating comprises applying tunnel encapsulation to the fragments.

9. The method of claim 8, wherein restoring the IP-ID of the reassembled second packet comprises:
   reading a constant from the encapsulation of the second packet; and
   subtracting the constant from the IP-ID of the second packet.

10. The method of claim 7, wherein the fragments are encapsulated with an IP header, the IP headers including the source address, the destination address, and the IP-ID.

11. The method of claim 1, further comprising:
   determining that the reassembled first packet is corrupted;
   discarding the reassembled first packet; and
   substituting the reassembled second packet for the reassembled first packet.

12. The method of claim 1, wherein the first node is a branch of an SD-WAN.

13. The method of claim 12, wherein the second node is a branch of the SD-WAN.

14. The method of claim 1, wherein the second node is on a first network having a first maximum transmission unit that is larger than the first packet, wherein the tunnel has a second maximum transmission unit that is smaller than the first packet, and wherein the fragments are smaller than the maximum transmission unit of the tunnel.

15. The method of claim 1, further comprising:
selecting a first path to the destination address for the first packet; and
selecting a second path to the destination address for the second packet.

16. A non-transitory computer-readable storage medium containing program instructions, wherein execution of the program instructions by the computer causes the computer to perform operations comprising:
receiving a first packet at a first node, the first packet having a source address, a destination address, and an internet protocol identification (IP-ID);
replicating the first packet to create a second packet;
fragmenting the first packet and the second packet into fragments for transmission through a tunnel in one or more paths between the source address and the destination address;
modifying the IP-ID of the second packet;
encapsulating the fragments of the first packet and separately encapsulating the fragments of the second packet for transmission through the tunnel;
transmitting the encapsulated first packet fragments and the encapsulated second packet fragments through the tunnel;
receiving the encapsulated first packet fragments through the tunnel at a second node;
reassembling the first packet at the second node using the first packet fragments;
receiving encapsulated second packet fragments through the tunnel at the second node;
reassembling the second packet at the second node using the second packet fragments; and
restoring the IP-ID of the reassembled second packet to be the IP-ID of the first packet.

17. The medium of claim 16, wherein modifying the IP-ID comprises adding a constant to the IP-ID of each fragment of the second packet and wherein the fragments of the second packet include an overlay header with an indication of the constant added to the IP-ID.

18. The medium of claim 17, wherein the fragments of the second packet include an overlay header with an indication of a replication ID, the replication ID being a scaling factor applied to the constant.

19. An apparatus comprising:
a first node of a wide area network having:
a replication module of the first node to receive a first packet at the first node, the first packet having a source address, a destination address, and an internet protocol identification (IP-ID) and to replicate the first packet to create a second packet;
a fragmentation module of the first node to fragment the first packet and the second packet into fragments for transmission through a tunnel in one or more paths between the source address and the destination address, and to modify the IP-ID of the of the second packet; and
an egress module of the first node to encapsulate the fragments of the first packet and separately encapsulate the fragments of the second packet for transmission through the tunnel; and
a second node of the wide area network having:
an ingress module of the second node to receive the encapsulated first packet fragments through the tunnel at the second node, and to receive the encapsulated second packet fragments through the tunnel at the second node; and
a reassembly module to reassemble the first packet at the second node using the first packet fragments and to reassemble the second packet at the second node using the second packet fragments, wherein the second packet is a replication of the first packet,
wherein the reassembly module is further to restore the IP-ID of the reassembled second packet to be the IP-ID of the first packet.

20. The apparatus of claim 19, wherein the egress module encapsulates the fragments by encapsulating each fragment with a software-defined wide area network header including the IP-ID.

* * * * *